United States Patent [19]

Bourrelly et al.

[11] Patent Number: 4,684,265

[45] Date of Patent: Aug. 4, 1987

[54] HEAT FLUX METER FOR CHECKING CALORIGENIC MATERIALS WITHIN A CONTAINER

[75] Inventors: Paul Bourrelly; Henri Patin; Robert Schoepp, all of Marseille; Charles Sanson, Chatenay-Ilaleb, all of France

[73] Assignee: Commissariat a l'Energie Atomique, Paris, France

[21] Appl. No.: 600,456

[22] Filed: Apr. 16, 1984

[30] Foreign Application Priority Data

Apr. 19, 1983 [FR] France ............................... 83 06366

[51] Int. Cl.⁴ ...................... G01N 25/20; G01K 17/08
[52] U.S. Cl. ......................................... 374/43; 374/30; 374/32; 376/247; 376/272
[58] Field of Search ........................ 374/10, 11, 12, 13, 374/29, 30, 31, 32, 14, 15, 110, 111, 112, 113, 115, 43, 44, 135, 134, 137, 147, 148, 179, 196, 185; 136/224, 229; 376/254, 247, 450, 212; 220/71; 250/506.1

[56] References Cited

U.S. PATENT DOCUMENTS

| | | | |
|---|---|---|---|
| 1,528,383 | 3/1925 | Schmidt | 374/30 |
| 3,022,478 | 2/1962 | Fish | 338/31 |
| 3,111,844 | 11/1963 | VanLuik, Jr. | 374/29 |
| 3,665,762 | 5/1972 | Domen | 374/31 |
| 3,714,832 | 2/1973 | Howell et al. | 374/30 |
| 3,798,003 | 3/1974 | Ensley et al. | 374/13 |
| 4,065,022 | 12/1977 | Cainnud | 220/71 |
| 4,114,442 | 9/1978 | Pratt | 374/113 |
| 4,147,938 | 4/1979 | Heckman et al. | 250/506.1 |
| 4,197,738 | 4/1980 | Degenne | 374/30 |
| 4,198,859 | 4/1980 | Holtermann | 374/30 |
| 4,346,864 | 8/1982 | Feller | 236/1 R |
| 4,352,290 | 10/1982 | Neils | 374/29 |
| 4,363,556 | 12/1982 | Billeveau et al. | 374/185 |
| 4,384,793 | 5/1983 | O'Brien | 376/247 |
| 4,555,764 | 11/1985 | Kuehn | 374/29 |

FOREIGN PATENT DOCUMENTS

| | | |
|---|---|---|
| 0018198 | 10/1980 | European Pat. Off. . |
| 0082763 | 12/1981 | European Pat. Off. . |
| 2048489 | 10/1970 | Fed. Rep. of Germany . |
| 2140528 | 1/1973 | France . |
| 2170795 | 9/1973 | France . |
| 2243427 | 4/1975 | France . |
| 2062860 | 11/1979 | United Kingdom . |

*Primary Examiner*—Charles Frankfort
*Assistant Examiner*—Thomas B. Will

[57] ABSTRACT

Heat fluxmeter incorporating a row of thermistors, whose electrical resistance varies significantly with the temperature and which are arranged on the outer surface of the container for accurately measuring the temperature thereof. The range of temperatures in the vicinity of the container is determined by means of a second row of thermistors. It is possible to deduce therefrom the heat flux leaving the container, i.e. the power emitted by the calorigenic material contained therein. The considerable sensitivity of this meter makes it possible to use it without excessively disturbing the thermal equilibrium so that the measurement can be carried out in a very short time.

4 Claims, 7 Drawing Figures

HEAT FLUX METER FOR CHECKING CALORIGENIC MATERIALS WITHIN A CONTAINER

BACKGROUND OF THE INVENTION

The present invention relates to a heat fluxmeter for checking calorigenic materials within a container.

It has numerous applications in widely differing nuclear and non-nuclear fields and particularly in the management of storage areas for calorigenic nuclear materials, where it makes it possible to measure the quantities of such materials in a very short time.

It is known that any radioactive element emits radiation which, if it is absorbed by the air or the material placed within the volume defined by the sensor, i.e. the cell of the calorimeter it is converted into heat. By measuring this heat quantity, it is possible to know for a given radioactive element the quantity of the radioactive product within the measuring cell. For example, it is possible to know the quantity of tritium in a tritiated compound, as a result of the emission of the $\beta$-radiation of the tritium. In the same way, the radionuclides present in plutonium, americium, neptunium, etc. emit $\alpha$ radiation, whose energy is converted into heat in the very mass of the sample. This heat quantity is measured in a previously calibrated calorimeter. It is linked with the mass of plutonium, americium, neptunium etc. contained in the sample.

Such a calorimeter is described in French Pat. No. EN7203249. This apparatus uses as the detector a double electrical resistor, whose sensitivity is not very great. Therefore, the accuracy of the measurements is only acceptable when the temperature gradient between the two measuring resistors is adequate, which is obtained by separating the said resistors by a thermally insulating material.

Under these conditions, thermal equilibrium is only reached after about 10 or 20 hours and during this time it is necessary to maintain the reference temperature as constant as possible and checks must be made at regular intervals.

Finally, the known fluxmeter is a costly instrument, is not easy to use, is difficult to transport and is also not suitable for all container types.

SUMMARY OF THE INVENTION

The object of the invention is to obviate these disadvantages. Thus, unlike in the prior art fluxmeter, every effort is made to bring about a minimum disturbance to the thermal equilibrium of the sample in its container, as well as the ambient medium.

The present invention therefore relates to a heat fluxmeter for checking calorigenic materials within a container having thermometer probes in the form of thermistors, wherein the thermistors are distributed in a first row located on the outer surface of the container, said thermistors being in thermal contact with the container and thermally insulated from the ambient air, and a second row located on the surface of a piece of good heat conducting material immersed in the ambient medium of the container.

According to another feature, each thermistor is placed in a support formed from a rigid part and a flexible, thermally insulating part, the latter containing the thermistor and protecting it from the influence of ambient air.

According to another feature, the container is a confinement for calorigenic radioactive materials in a centered transportation cage and the first row of thermistors is placed on the surface of said confinement by means of belts and the second row is placed on strips fixed to the tubular posts forming the said cage.

According to another feature, the number and positioning of the belts carrying the first row of thermistors correspond to the number and location of the calorigenic samples within the confinement.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1:
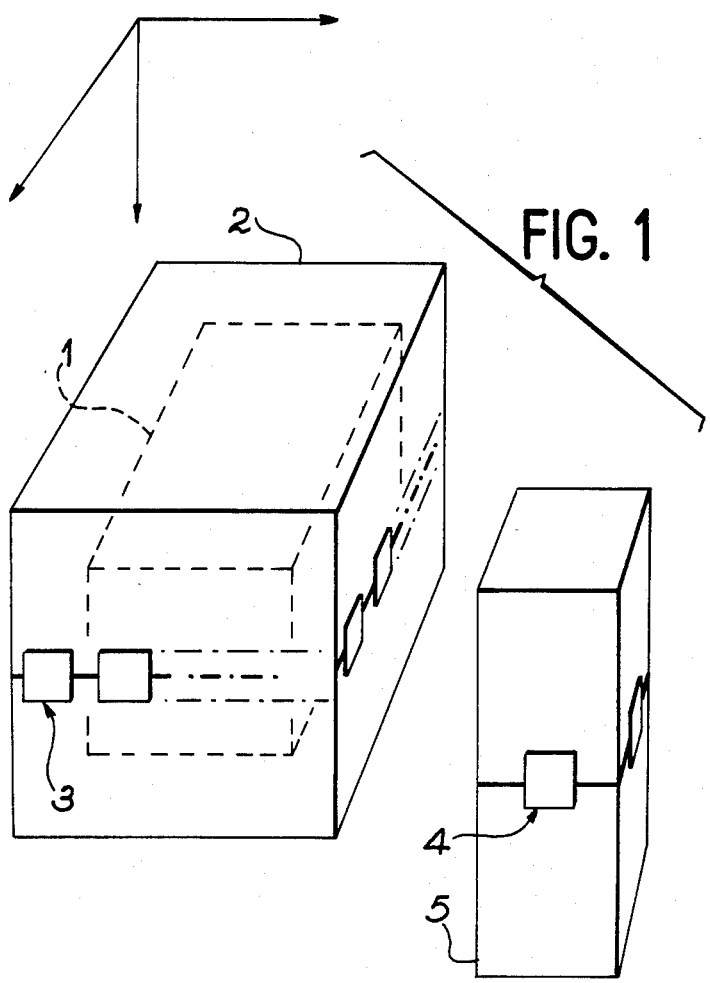
FIG. 1 diagrammatically and in perspective the heat fluxmeter according to the invention.

FIG. 1 shows a calorigenic material sample 1 in a container 2. On the wall of the latter is provided a first row of thermistors 3, whose geometrical distribution has been chosen so as to obtain a significant value both of the temperature of said surface and of the sample within the container.

In the ambient medium surrounding this container is shown a second row of thermistors 4, which are fixed to the surface of a piece 5 of a good heat conducting material. The heat flux leaving the container leads to a temperature gradient between the two rows of thermistors. On the basis of the latter and by means of a prior calibration, it is possible to deduce in known manner the calorigenic material quantities within a container.

Figure 2:
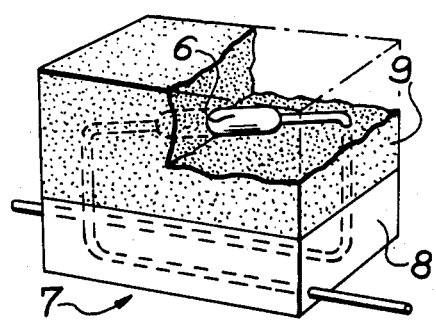
FIG. 2 diagrammatically a thermistor support.

As shown in FIG. 2, each thermistor thermoister meter 6 is placed in a support 7 constituted by a rigid part 8 and a thermally insulating, flexible part 9. The thermistor is embedded in the latter and is consequently protected from the influence of the ambient air. For example, the rigid part can be made from Teflon and the flexible part from polyether foam.

Figure 3:
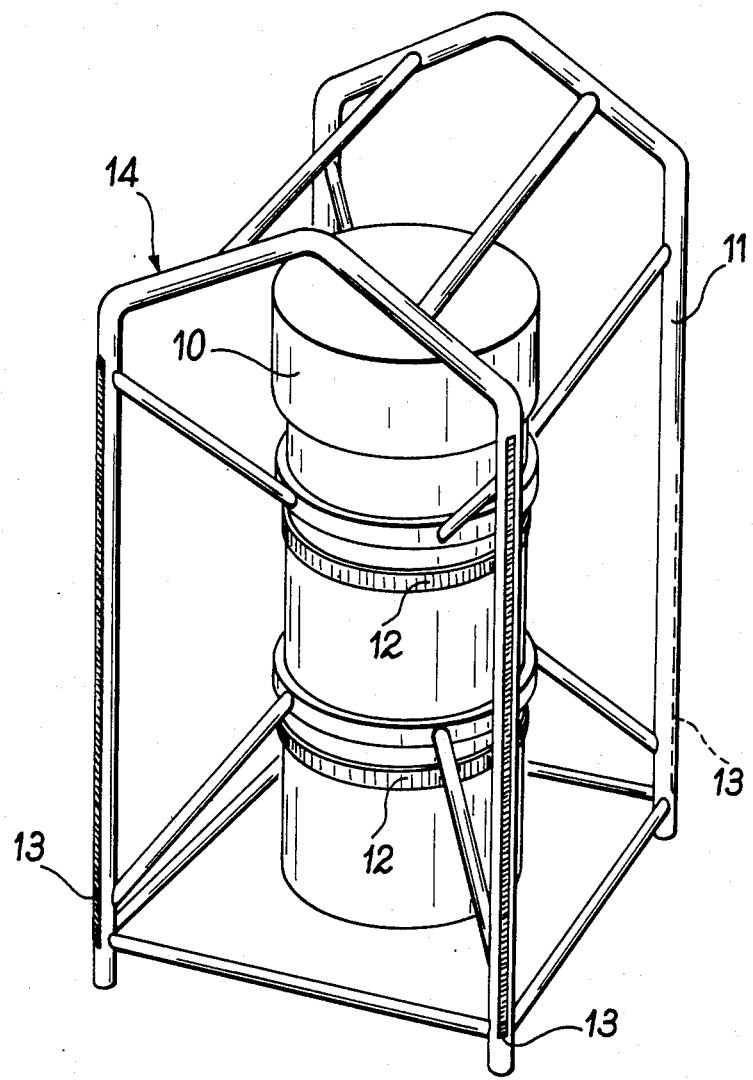
FIG. 3 diagrammatically an embodiment of a calorigenic radioactive material confinement and its transportation cage, as well as the installation of the thermistors by means of belts and strips.

FIG. 3 shows an application of the fluxmeter according to the invention with a calorigenic, radioactive material confinement 10 in a centred transportation cage 14.

Figure 4A:
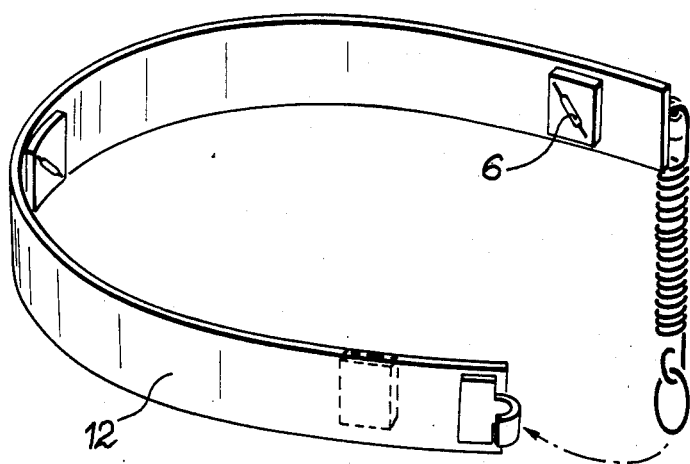
FIG. 4a diagrammatically an embodiment of a flexible belt carrying thermistors.

The confinement is cylindrical and therefore according to a preferred embodiment, the first row of thermistors is fixed to belts 12, which can easily be placed on the wall of the cylinder in the manner shown in FIG. 4a.

Confinement 10 contains 1 to 4 superimposed samples and the power emitted by each sample is between 0 and 12 W. As numerous power sources are arranged, it is indispensible that the measurement of the heat flux enables the simultaneous definition of the geometrical position of each sample. This is why the arrangement of each belt carrying the group of thermistors is such that it supplies a significant value both of the temperature and of the positioning of the calorigenic sample within confinement 10.

Figure 4B:
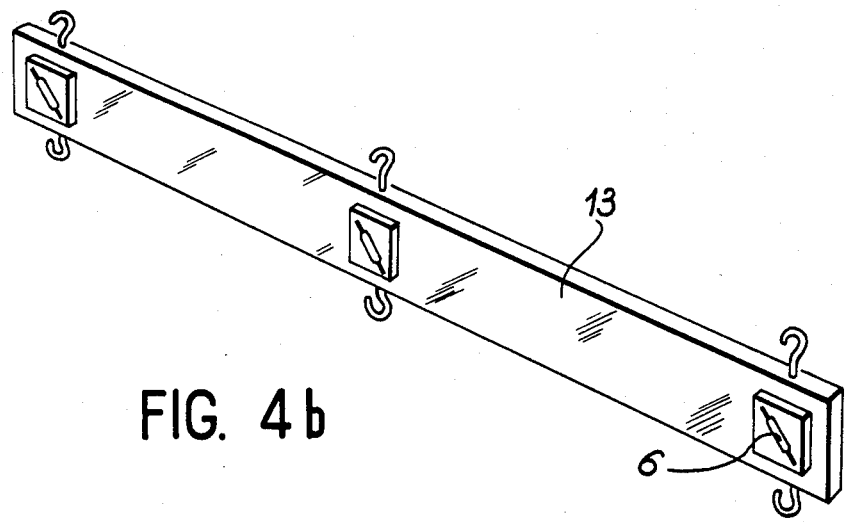
FIG. 4b a strip carrying thermistors.

Thermistors forming the second row are grouped on strips 13 (FIG. 4b), which are easy to fix to the tubular posts and the assembly forms the transportation cage 14. These posts have good heat conduction properties and are immersed in ambient air. The thermal contact between the thermistors of the second row and the pieces of material with good heat conducting characteristics, such as the metal tubes 11 forming the cage, make it possible to measure a mean ambient temperature value, which does not follow the abrupt temperature changes caused by momentary disturbances.

Figure 5:
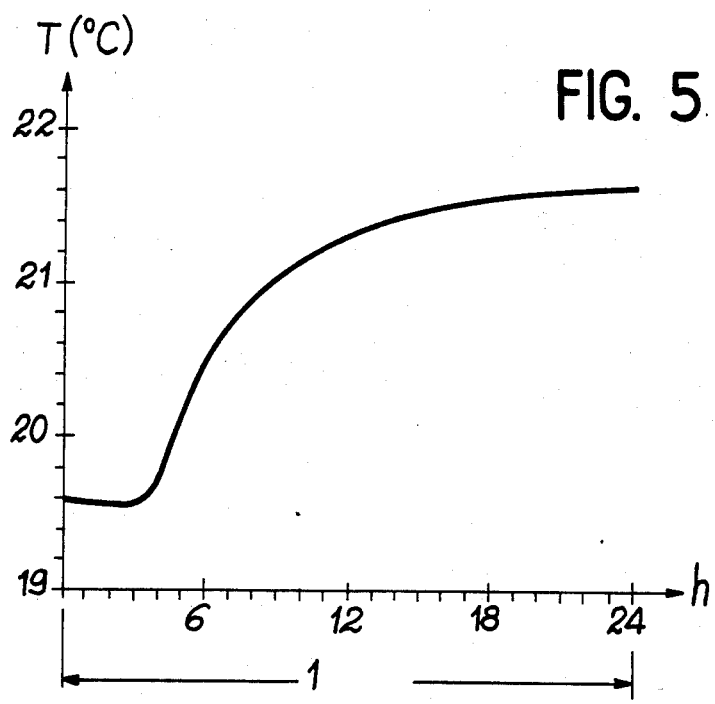
FIG. 5 a graph showing the curve of the temperatures measured on the wall of a confinement, as a function of the time after the introduction of the radioactive samples.
Figure 6:
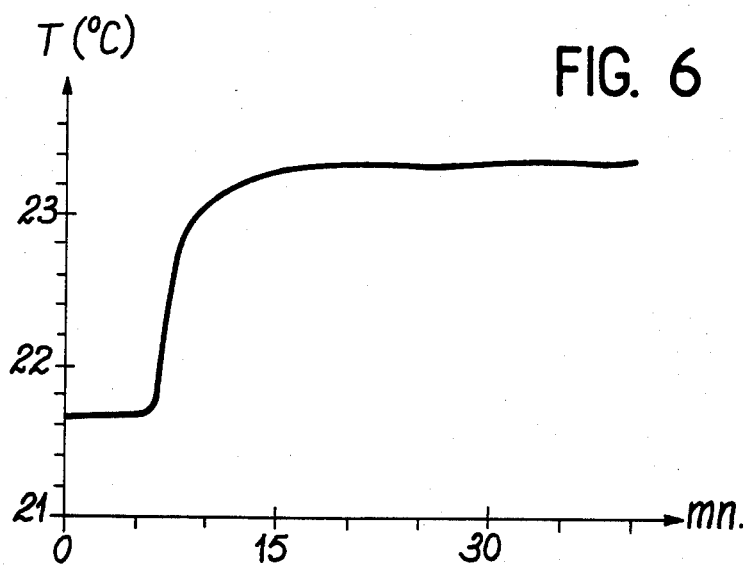
FIG. 6 a graph showing the curve of the temperatures after installing the thermometer probe.

The calorigenic samples have been introduced into the cage well before the measurement, because the thermal equilibrium is only reached after a considerable time (approximately 24 hours, as is shown in FIG. 5), due to the considerable mass of the system and its great thermal inertia. When fitting the belts and strips, approximately 20 minutes elapses before the equilibrium conditions are reached, as is shown by FIG. 6.

Thus, the calorimetric method makes it possible to carry out measurements approximately 20 minutes after the fitting of the thermometer probes.

An accuracy of measurement of 1 to 6% is obtained, as a function of the degree of temperature regulation within the room in which measurement takes place.

The example of an application of the heat fluxmeter according to the invention with a confinement for the calorigenic radioactive materials described hereinbefore shows its high performance characteristics in an industrial area, which makes it possible to develop a measurement system which satisfactorily meets the use constraints:

the measuring time does not exceed a few dozen minutes;

the accuracy obtained is 1 to 6%, as a function of the variations in the ambient conditions;

the heat fluxmeter is easy to fit and transport.

Finally, the simplicy of the heat fluxmeter makes it inexpensive.

It is also possible to envisage the use thereof for checking nuclear reactor assemblies, provided that the power released is adequate, for evaluating the degree of fouling by calorigenic materials of filters at the exit from gloveboxes, for checking wall storage containers for radioactive products, etc.

What is claimed is:

1. A device for checking a quantity of calorigenic materials, comprising: a container containing said quantity of calorigenic materials, a transportation cage within which said container is centered, said transportation cage being made of a good heat conducting material, a heat flow probe for sensing heat flow generated by said calorigenic materials, said probe comprising at least a first set of a plurality of first thermistors connected in series and located on an outer surface of said container, said first thermistors being in thermal contact with said container and thermally insulated from ambient air for sensing a mean temperature of the container, and at least a second set of a plurality of second thermistors connected in series and located on said transportation cage and in thermal contact with the ambient air for sensing a mean temperature of the ambient air, whereby a difference between said mean temperatures sensed by said sets indicates the heat flow from said container and thereby the quantity of calorigenic materials in said container.

2. A device according to claim 1, comprising a support for each first thermistor, said support having a rigid part and a flexible, thermally insulating part, said first thermistors being arranged in said thermally insulating part for protecting the same from the influence of the ambient air.

3. A device according to claim 2, comprising a belt placing said set of first thermistors on the surface on said container, said transportation cage having tubular parts, and strips for fixing said set of second thermistors to said tubular parts.

4. A device according to claim 3, comprising a plurality of belts corresponding in number and location to the number and location of calorigenic materials in said container.

* * * * *